United States Patent [19]

Bailey

[11] Patent Number: 4,850,798

[45] Date of Patent: Jul. 25, 1989

[54] MODIFIED HELICOIDAL WIND RESPONSIVE DEVICE

[76] Inventor: Dennis B. Bailey, 305 W. Austin, New Braunfels, Tex. 78130

[21] Appl. No.: 276,480

[22] Filed: Nov. 28, 1988

[51] Int. Cl.$^4$ .............................................. F03D 1/06
[52] U.S. Cl. .................................. 416/11; 416/132 B; 416/176; 416/240; 73/188
[58] Field of Search ................. 416/11, 176 A, 176 R, 416/170 A, 132 B, 84–86, 240 A; 73/188, 189, 187

[56] References Cited

U.S. PATENT DOCUMENTS

| | | | |
|---|---|---|---|
| 550,552 | 11/1895 | Budd | 416/176 R |
| 893,052 | 7/1908 | Carlson | 416/176 A |
| 996,309 | 6/1911 | Carlson | 416/176 A |
| 1,064,695 | 6/1913 | Koning | 416/176 R |
| 4,087,990 | 5/1978 | Gillette | 416/176 A |
| 4,152,933 | 5/1979 | Woodhouse | 73/189 |
| 4,165,468 | 8/1979 | Fry et al. | 416/169 B |
| 4,207,026 | 6/1980 | Kushto | 416/84 |
| 4,548,073 | 10/1985 | Ludden | 73/187 X |
| 4,624,648 | 11/1986 | Waters | 73/189 X |
| 4,708,592 | 11/1987 | Krolick et al. | 416/176 A |

FOREIGN PATENT DOCUMENTS

| | | | |
|---|---|---|---|
| 47656 | 5/1911 | Austria | 416/176 R |
| 96619 | 4/1924 | Austria | 416/11 |
| 93909 | 9/1897 | Fed. Rep. of Germany | 416/176 R |
| 2935803 | 3/1981 | Fed. Rep. of Germany | 416/176 A |
| 600368 | 2/1926 | France | 416/176 A |
| 827487 | 4/1938 | France | 416/11 |
| 57874 | 3/1988 | Japan | 416/176 A |
| 11811 | 1/1896 | Switzerland | 416/176 R |
| 16558 | 3/1898 | Switzerland | 416/176 R |
| 1250697 | 8/1986 | U.S.S.R. | 416/176 A |
| 1273638 | 11/1986 | U.S.S.R. | 416/176 A |

Primary Examiner—Everette A. Powell, Jr.
Attorney, Agent, or Firm—Gregory J. Nelson

[57] ABSTRACT

A wind actuated device which has a sail in the shape of a double or single modified helicoid. The device may be provided as a decorative novelty device or may be supported on a mast as a wind indicating device.

12 Claims, 2 Drawing Sheets

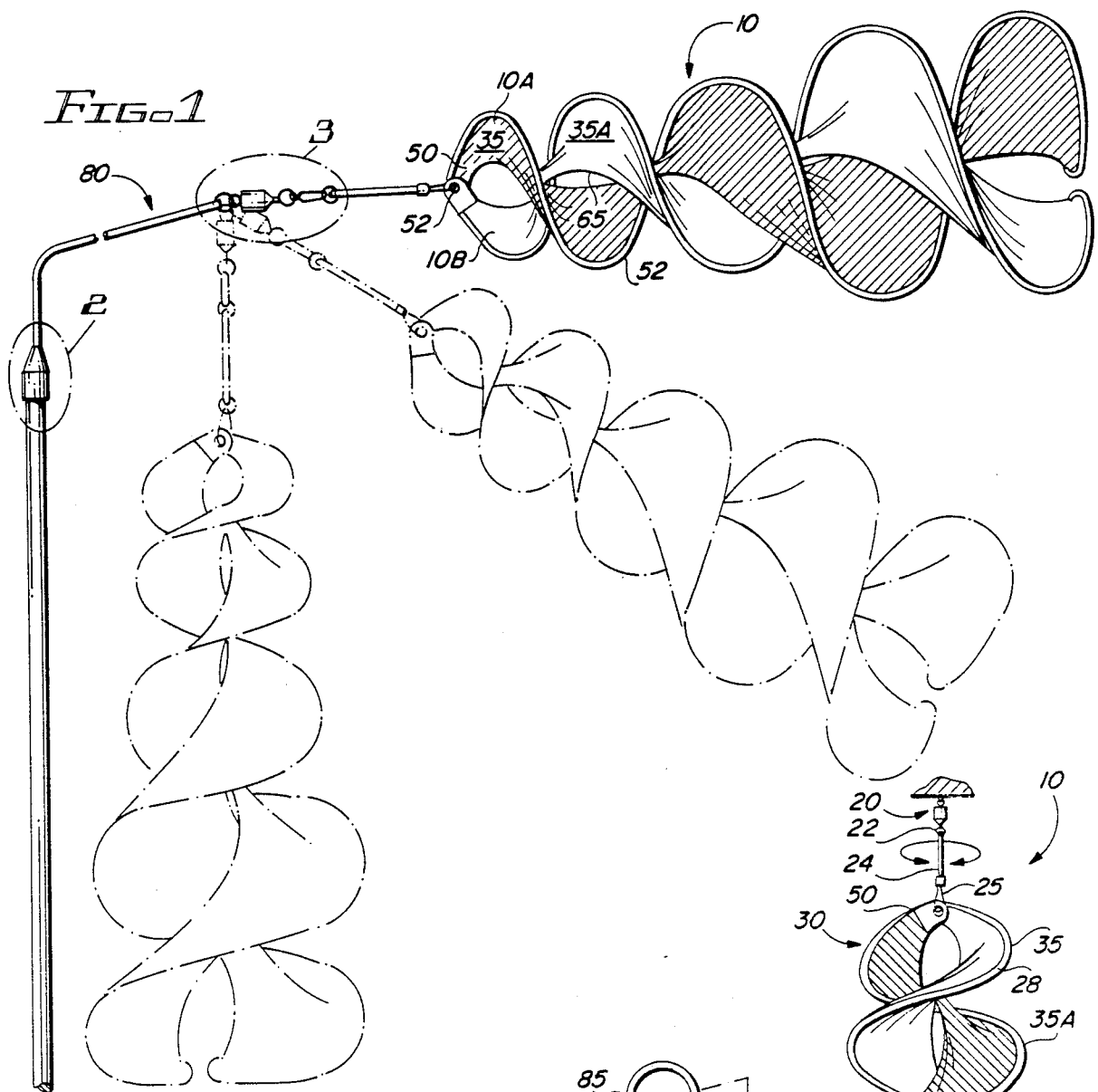
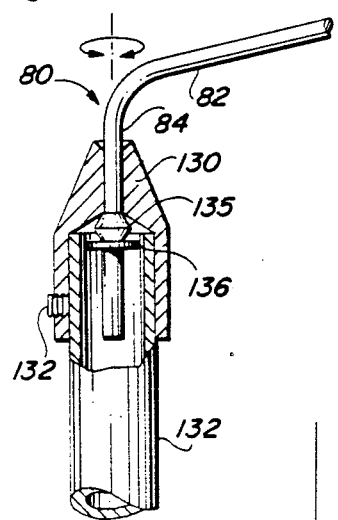
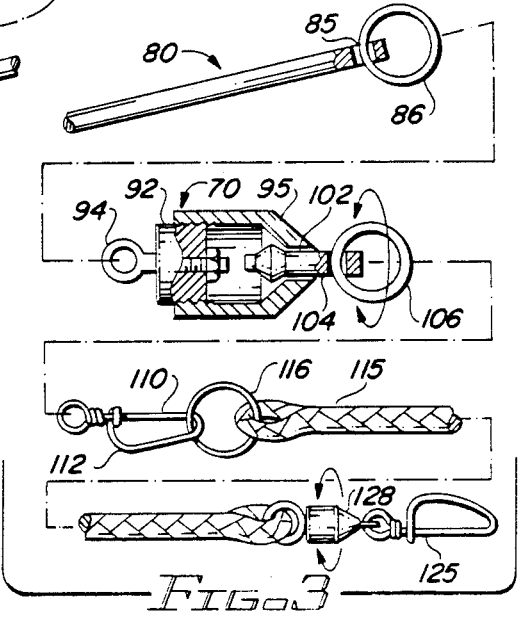
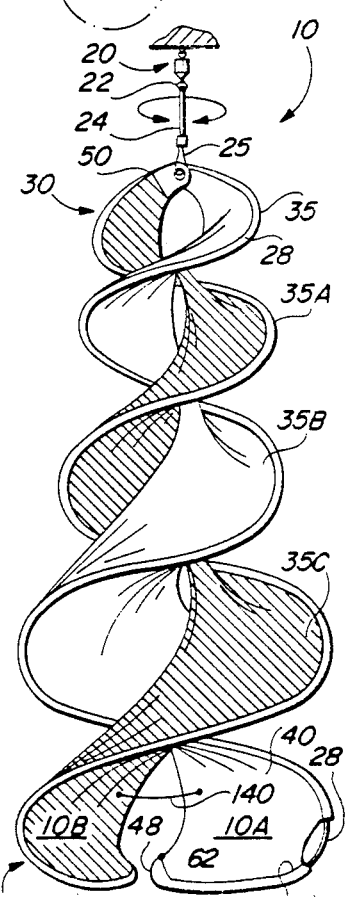

MODIFIED HELICOIDAL WIND RESPONSIVE DEVICE

The present application relates to an air-propelled device useful as a decorative or display item and which also functions as a wind direction and velocity indicator More particularly, the present invention relates to a modified helicoidal structure which, when subjected to wind forces, will rotate and also assume an orientation and motion to provide a decorative effect and also to provide a visual indication of wind direction and velocity.

Various wind actuated devices which serve as novelty or amusement devices may be found in the prior art. One of the best known and one of the simplest is the pinwheel which is generally manufactured from a blank of paper or plastic is provided with curved slits which when assembled are secured to a central axis to provide a plurality of blades. The pinwheel is generally arranged on an axle or shaft and when subjected to a current of air, the pinwheel will rotate to provide a pleasing effect. The patent to Greger, U.S. Pat. No. 1,669,748 discloses a type of pinwheel or whirler adapted to spin about an axis by action of air current against the device or by said device being quickly moved against the air to produce currents of air against or through the device.

Other types of rotary aerial toys can also be found in the prior art. For example, U.S. Pat. No. 4,624,648 shows a tubular sleeve of flexible material which tapers from the head end to the tail end. The head end receives a bridle construction for supporting the sleeve. The sleeve includes plural strips extending at least generally longitudinally of the sleeve which strips are interconnected. The head and margins of the strips are secured to a ring to provide air chutes causing the sleeve to rotate.

Various other flexible or non-rigid rotating wind structures can be found in the prior art which, in addition to providing an interesting decorative effect, also provide useful benefits. For example, the simple wind sleeve or sock utilized at airports provides information relative to wind conditions to pilots of aircraft. Wind sleeves are normally mounted so that the wind can turn the sleeve into a position aligned with the direction of wind flow with the point of the sleeve indicating wind direction. Typically, the conventional wind sleeve or wind sock does not rotate about its own axis but serves an important informational function.

Other non-rigid wind devices operate to extract power from the wind. For example, U.S. Pat. No. 4,708,592 shows a collapsible structure in which a flexible fabric sheet is reinforced by wire sewn at its edges to form a generally helicoidal-shaped turbine. One end of the turbine is fixed by a swivel to a mast while the other end is connected to the shaft of an alternator. Electrical output of the alternator is connected through a rectifier/regulator to a storage battery to provide a constant dc power source.

While the foregoing devices provide wind actuated devices which are functional and aesthetically pleasing, there exists a need for such a device which at low wind conditions will rotate to provide a decorative effect and more importantly will provide visual information relative to wind conditions such as direction, velocity and shear.

Accordingly, it is an object of the present invention to provide a decorative and flexible wind-responsive device which is in the shape of a double or single modified helicoid.

It is an another object of the present invention to provide a wind actuated device which will rotate about its axis and orient itself to provide a visual indication of wind speed, wind velocity and wind shear conditions.

Another object of the invention is to provide a wind-responsive device which is efficient and can be inexpensively manufactured from various materials such as cloth or ripstop nylon.

The above and other objects and advantages of the invention will become more apparent from consideration of the following description and accompanying drawings in which:

FIG. 1 is a perspective view of the wind-responsive indicator device shown in full lines in a high wind condition with several other positions indicated in dotted;

FIG. 2 is a detail view of the mast and pivot as indicated in FIG. 1;

FIG. 3 is a detail view of the swivel as indicated in FIG. 1;

FIG. 4 is a perspective view of the wind-responsive device suspended to operate as a display or decorative device;

Figure 5:
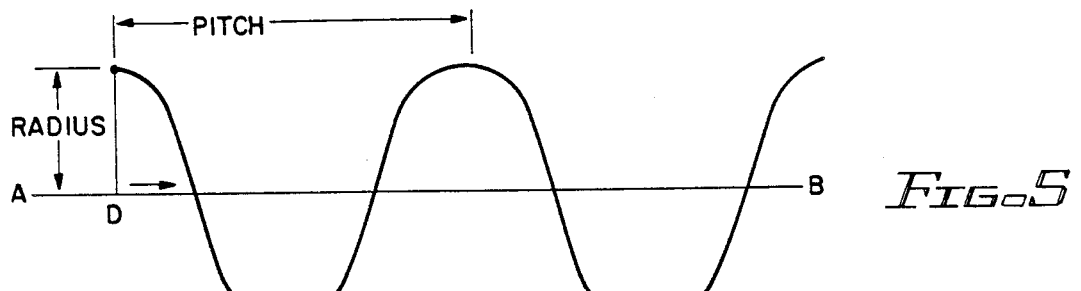
Figure 5A:
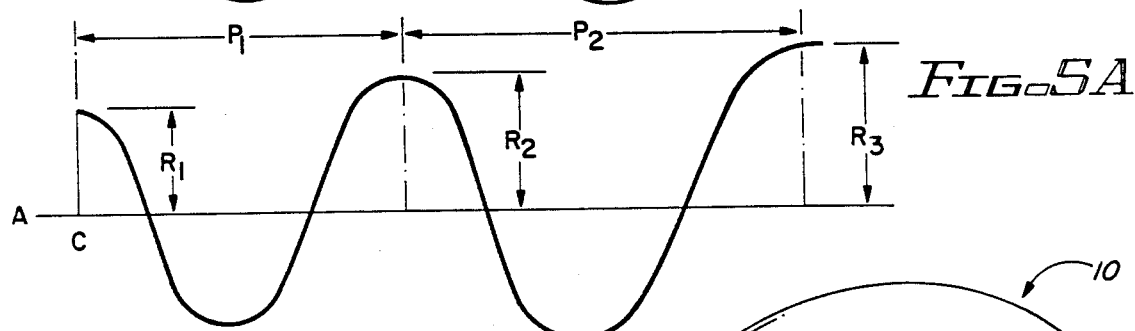
Figure 6:
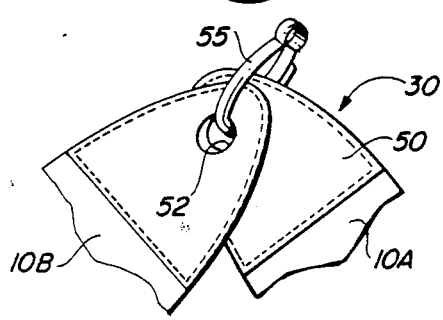
Figure 8:
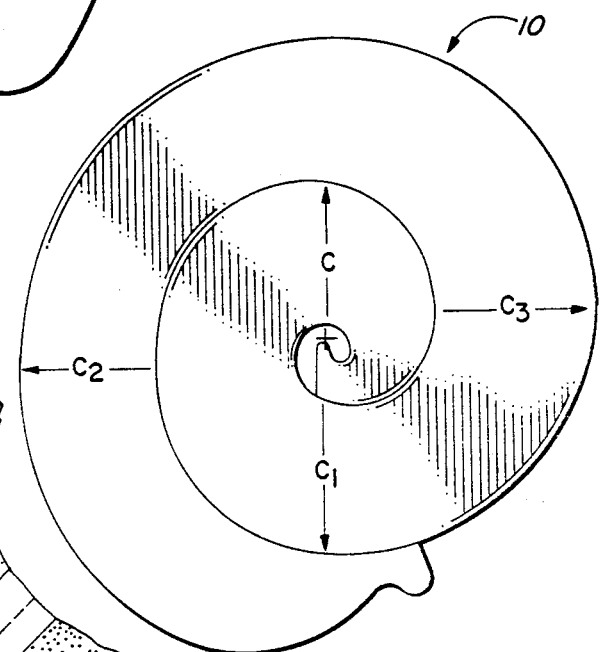
Figure 7:
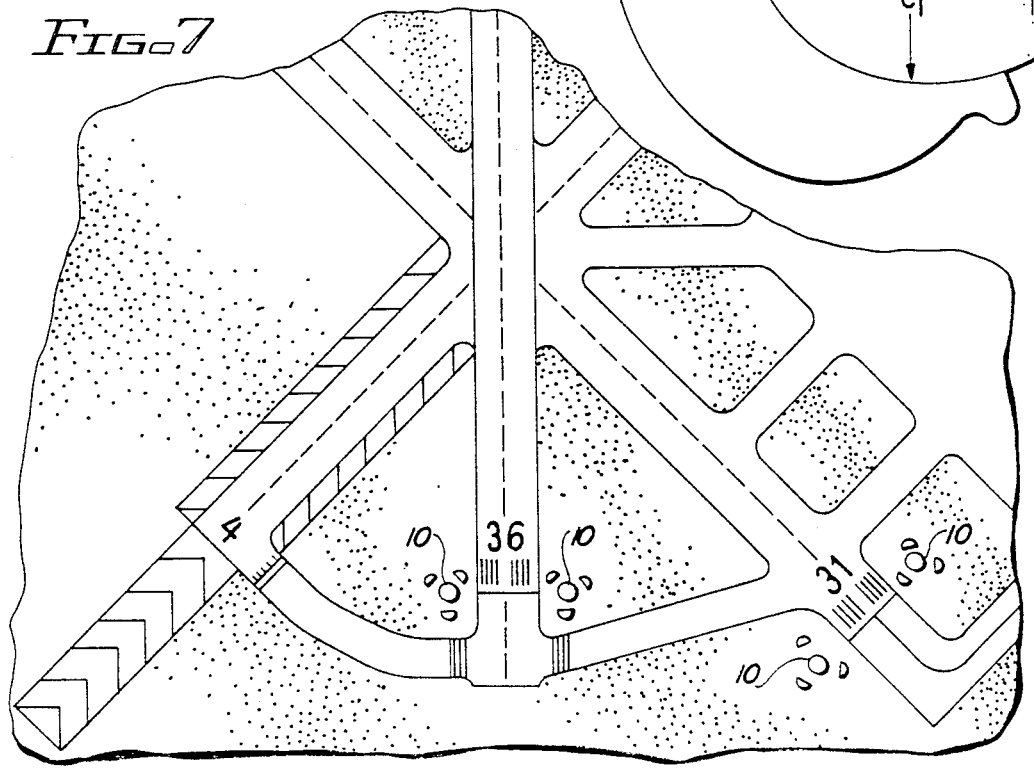

FIGS. 5 and 5A diagram the generation of a regular and modified helicoid;

FIG. 6 is a detail view of the head end attachment of the device as indicated in FIG. 1;

FIG. 7 illustrates the positioning of multiple wind-responsive devices adjacent an airstrip for providing a visual indication to pilots of wind conditions;

FIG. 8 is a plan view of the sail of the wind responsive device in a flat or planar position as it would be cut from a piece of material.

The wind-responsive device of the present invention is configured in the form of a modified double or single helicoid. A helicoid is a three-dimensional surface formed by two line segments positioned at right angles with respect to one another with one rotating about the other as an axis while simultaneously moving along the axis line. The generation of the conventional regular helicoid is shown in FIG. 5. In FIG. 5, line AB defines a fixed longitudinal axis. Line CD is of finite length and moves along line AB and while moving also rotates around line AB as an axis at uniform rate. Thus, point C on CD traces a continuous line which is helical as a point moving about the surface of a cylinder. The surface extending between AB and the curve traced by point C is a single right helicoid because the generating line and therefore the resulting surface lies at a right angle to the axis.

In the event line CD is perpendicular to longitudinal axis AB and extends an equal distance on both sides of the axis and is moved along the line or axis AB while rotating, both points C and D will trace a helix. The three-dimensional surface traced or generated by line CD is a double helicoid.

In the modified helicoid shown in FIG. 5A, the radii R, R1, R2 of each successive helix increases. Therefore, R2 is greater than R1 and so on. Also, the pitch distance between successive helices may successively increase in the modified form of helicoid shown in FIG. 5A, with P2 being greater than P1.

Hereafter, unless otherwise qualified, the term "modified helicoid" denotes either a single or double helicoid which has successive sections of increasing radius and in which the pitch may be uniform or may be successively increasing. Further, the term "modified helicoid" refers to a closed structure having a surface extending from the edge of the generated shape to the longitudinally extending axis.

Turning now to the drawings, particularly FIG. 4, a wind-responsive device 10 having a modified helicoidal structure according to one embodiment of the present invention is shown. This embodiment, intended primarily as a decorative device, is suspended at its upper end from a swivel 20 connected to an eyelet 22 permitting free rotation of the structure. The eyelet 22 is attached to a flexible leader 24 having a snap or clip 26 at the lower end attached to the head or upper end 30 of the device 10.

The modified helicoidal shaped device 10 has a continuous flexible wire frame 28 extending helically from the head 30 and terminating ar the lower or tail end 32 of the device. The wire forms a plurality of individual helical sections 35, 35A, 35B of downwardly increasing radius. The pitch between succeeding helical sections 35, 35A, 35B increases downwardly. As shown in FIG. 4, the wind-responsive device is assembled from two devices 10A, 10B commonly secured at their head ends and suspended along a common vertical axis. This results in a more aesthetically interesting effect particularly when the individual devices 10A, 10B are of contrasting colors. The effect, when subjected to moving air currents, is of a multi-colored upwardly moving screw.

A fabric sail 40 extends from the wire frame being fastened to the wire 28 by a continuous turned seam 42. The fabric sail in the assembled position has a generally longitudinal edge 45 extending from the head end 30 terminating at a reinforced section 48 at the tail end 32 of the wire frame member. The sail is preferably made of a porous cloth or cloth-like material such as ripstop nylon or polyester. The material preferably has a satin finish which is reflective to provide high visibility both to the edge and to provide a radar recognizable surface. The material is also selected in high visibility colors for the particular environment.

FIG. 8 illustrates the modified helicoidal sail in a flat position. The sail may be cut from a single piece of fabric (C) as shown with the cut preferably having a ratio of 1 unit to approximately 1.68 units displaced 180° apart. Thus, C1 is approximately 1.68 times greater than C and C2 approximately 1.68 times greater than C3. It has been found that this ratio produces the best response and movement.

As seen in FIG. 6, the head 30 of the devices 10A and 10B each terminate at a reinforced section 50. Section 50 is generally tongue-shaped having a layer of fabric peripherally and laterally stitched to the sail. A grommet 52 is centrally positioned in the reinforced section to receive a snap hook 55 or other mounting assembly. Rib 28 is curved terminating at 58 in the reinforced section.

With the device suspended as shown in FIG. 4, a slight wind will cause rotation of the structure in the direction of the arrow as shown. In a gentle wind, the structure provides a pleasing and decorative effect and may be utilized in this form for residential and commercial use as the device may be hung in an outside patio area or supported in a commercial establishment in an area where a moving air current prevails in order to attract commercial interest.

The modified helicoid structure responds well to even a slight breeze or slight movement of air as low as one knot causing rotation which gives the visual impression of an upwardly moving auger.

FIGS. 1 to 3 show a modified form of the present invention which functions as a wind indicator to provide a visual indication of wind velocity and wind direction replacing the conventional wind sleeve. Further, the device is effective to provide an indication of a wind shear condition. In this embodiment, the device 10 includes individual helicoid devices 10A and 10B each being a modified helicoidal structure arranged about a common longitudinal axis. Modified helicoidal device 10A and 10B are constructed as has been described each having an upper reinforced end 50 having grommet 52. A continuously extending flexible frame 28 extends from the upper head end to the tail end forming a plurality of helical sections 35, 35A, etc. As has been described before, the individual helices are of downwardly increasing radius each successive helix being approximately 1.68 greater in radius than the immediately preceding helix. The pitch between successive helical sections 35, 35A, 35B also increases proceeding downwardly so that a modified helicoid structure is formed.

In the embodiment shown in FIG. 1 multiple devices 10A and 10B are arranged along a common axis and commonly connected at their upper end. FIG. 6 illustrates the proper attachment of sections 10A, 10B with their reinforced section oppositely extending. Preferably for the greatest visual effect, the two sections are of a different contrasting color preferably high visibility colors. As shown, the second structure l0B is constructed as generally as has been described above. With this arrangement, successive helical sections or wings 35, 35A, etc. are of alternating color and as the device is rotated under the influence of an air current, an interesting and aesthetically pleasing effect is achieved.

Conventional wind sleeves for indicating wind velocity and direction as used at many landing strips and airfields are of limited accuracy. At low wind conditions they are generally not particularly responsive and at higher wind conditions will extend generally perpendicular from the mounting pole which occurs at wind velocities as low as 5 knots. The pilot from a visual observation thus cannot accurately determine whether the wind velocity is approximately 5 knots or whether wind conditions substantially exceed that velocity. Other wind phenomena such as wind shear cannot be determined from a visual inspection of a conventional wind sleeve or sock.

The present invention has a valuable application as a visual wind indicating device. In this embodiment as seen in FIGS. 1 to 3, the assembly includes a pair of helicoid devices 10A, 10B mounted along a single longitudinal axis secured to a rotatable arm assembly 80. The arm assembly 80 has rod 82 which is shown mounted in a generally horizontal position. The rod is formed with an approximate 90° elbow forming a shorter leg 84 which is generally mounted in a vertical position. The outer end of the horizontal section 82 defines an aperture 85 which receives a split ring 86. The split ring attaches to a swivel assembly 70 as best seen in FIG. 3. The swivel assembly 90 includes a cylindrical plug 92 whrch carries an eye 94 attachable to ring 86 on the end of the rod 82. The plug is receivable in a generally cylindrical cap 95. The cap and plug may be of any suitable material such as plastic and adhesively bonded or in threaded engagement.

The tapered or conical end of of the cap and defines an aperture 102 which receives a pin 104 on which split ring 106 is mounted. Split ring 104 receives a coast lock 110 which has an arm 112 which may be opened. The coast lock attaches to a leader 115 at ring 116 which has another coast lock 125 and swivel 128 attachable to the grommets 52 at the head ends of sections 10A, 10B. The head ends should be mounted as shown in FIG. 6 in mirror-image relation.

The shorter leg 84 at the opposite end of the arm assembly is rotatively carried in a brass fitting 130 having an internal cavity received on mast 132. Set screw 132 may be provided engaging the mast. The end of arm 84 within the fitting is secured by a suitable compression sleeve 135 and retention clip 136. Mast 132 may be placed vertically, horizontally or inverted with fitting 130 at the lower end of the mounting rod. In these positions, the device 10 wall hang suspended in a generally vertical position and the arm 82 will allow the device to rotate in response to wind direction. A wind of minimal velocity will cause the sails to rotate about their longitudinal axis with the speed of rotation providing an indication of wind velocity. The use of distinctively colored multiple sails on a single axis provides better visual indication of wind velocity. The colors are selected for the particular application and environment. Thus, the observer seeing a slowly rotating sail will have a general indication of a low-wind velocity. A high-wind situation will be readily apparent to the observer due to the rapid rotation of the sails which give the appearance of the individual sails moving upwardly. The rotational speed provides an approximation of wind speed in accordance with the following:

$$\text{Wind Speed (Knots)} = \frac{\text{\# turns in 10 seconds}}{2}$$

Wind direction will be indicated by the orientation of the overall assembly. As wind velocity increases, the mounting assembly will rotate to allow the engine device to align with the head of the device pointing into the wind. A gentle wind will allow the device to hang in a near vertical position rotating slowly. As wind velocity increases, the device will rotate more rapidly and the device will be displaced from a generally horizontal position to a position between vertical and horizontal. The rotation is generally clockwise in the northern hemisphere and counterclockwise in the southern hemisphere. In units tested, a wind velocity of 1 to 2 knots will cause the device to assume an angular position approximately mid-way between vertical and horizontal, as shown in dotted in FIG. 1. At high wind conditions, those above 25 knots, the device will assume a generally horizontal position and oriented with the wind direction with the head end of the device pointing into the wind as indicated in full line representation in FIG. 1.

Some unusual conditions, such as nighttime thermal activity, can cause a condition in which the individual helicoidal sections 10A, 10B turn in opposite directions and tend to "unscrew" from one another. To prevent this, a tether 140 may interconnect the individual components as seen in FIG. 4.

The device of the present invention is particularly suitable as a visual wind indicating device at airfields and is effective in indicating wind shear conditions.

Wind shear is a phenomenon in which a localized area will experience a sudden downdraft (fall) which impacts the grounds (run) and is deflected upwardly (curl). Such sudden and generally unpredictable winds can have a severe effect on aircraft The conventional wind sock is not effective in responding to wind shear particularly the fall and curl portion of the phenomemom as the sock will assume a vertical position along the mast which a pilot may erroneously assume indicates little or no wind. With the present invention, the device will rotate in the vertical position indicating to the pilot that a fall condition exists. In a curl condition, the device will assume a position with tail above the head and the device pointing downwardly. The present device, due to its reflective surface, is highly visible and also the surface reflects to project a radar image.

The device, for greatest effectiveness, is installed at multiple locations at airfields aligned with the high intensity lights at both the approach and departure ends of the runway as seen in FIG. 7. The wind-responsive devices are mounted on break-away masts in the event of a collision with low-flying aircraft. Also, for night visibility, the masts and wind devices should be illuminated by flood lights.

It will be obvious to those skilled in the art to make various changes, alterations and modifications to the modified helicoidal wind responsive device as described herein. To the extent that these changes, alterations and modifications do not depart from the spirit and scope of the appended claims, they are intended to be encompassed therein.

I claim:
1. A wind-responsive device, comprising:
   (a) a flexible sail with a head and tail having an inner edge and outer edge, said inner edge generally defining a generally longitudinally extending axis and said outer edge extending from said head to said tail defining a plurality of generally helical sections of progressively increasing radii from said head to said tail; and
   (b) attachment means at the head end of said sail.
2. The device of claim 1 wherein multiple wind-responsive devices are arranged with their inner edges substantially on a common axis.
3. The device of claim 2 wherein said multiple devices are of different colors.
4. The device of claim 1 wherein said device is a wind condition indicator mounted on an arm, said arm having pivotal mounting means at one end and the other end being attached to said devices at attachment means comprising swivel means.
5. The device of claim 1 wherein said sail is nylon.
6. The device of claim 1 wherein said sail is polyester.
7. The device of claim 1 wherein said sail has a reflective surface.
8. The device of claim 2 wherein said multiple wind devices are interconnected by a tether.
9. The device of claim 1 wherein said sail includes frame means extending at least along the outer edge thereof.
10. A wind indicating system for pilots at an airstrip location, said system comprising:
   (a) a sail with a head and tail having an inner edge and outer edge, said inner edge extending generally longitudinally and said outer edge extending from said head to said tail in helical fashion defining a plurality of helical sections of progressively in- creasing radius, said sail having a continuous fabric covering extending between said edges;

(b) attachment means at the head end of said sail;

(c) a mast supporting each of said attachment means; and (d) said wind-responsive devices and masts being arranged at both the approach and departure ends of the airstrip.

11. The system of claim 10 wherein said masts are of breakaway construction.

12. The system of claim 10 wherein said devices are artifically illuminated.

* * * * *